(12) United States Patent
Sachsenmaier

(10) Patent No.: US 7,553,250 B2
(45) Date of Patent: Jun. 30, 2009

(54) DRIVE TRAIN OF AN ALL-WHEEL DRIVE VEHICLE

(75) Inventor: Helmuth Sachsenmaier, Graz (AT)

(73) Assignee: Magna Drivetrain AG & Co KG, Lannach (AT)

( * ) Notice: Subject to any disclaimer, the term of this patent is extended or adjusted under 35 U.S.C. 154(b) by 309 days.

(21) Appl. No.: 10/590,230

(22) PCT Filed: Feb. 22, 2005

(86) PCT No.: PCT/AT2005/000057

§ 371 (c)(1),
(2), (4) Date: Oct. 31, 2006

(87) PCT Pub. No.: WO2005/080116

PCT Pub. Date: Sep. 1, 2005

(65) Prior Publication Data

US 2007/0213165 A1    Sep. 13, 2007

(30) Foreign Application Priority Data

Feb. 23, 2004   (AT)   .............................. GM128/2004

(51) Int. Cl.
*F16H 37/08* (2006.01)
(52) U.S. Cl. .................. 475/199; 475/198; 475/223; 180/233; 180/248
(58) Field of Classification Search ................. 475/198, 475/199, 200, 223; 180/233, 248
See application file for complete search history.

(56) References Cited

U.S. PATENT DOCUMENTS

| | | | | |
|---|---|---|---|---|
| 3,963,085 A | * | 6/1976 | Vinton | 180/247 |
| 4,538,700 A | * | 9/1985 | Suzuki | 180/248 |
| 4,609,064 A | * | 9/1986 | Suzuki et al. | 180/233 |
| 4,709,775 A | | 12/1987 | Watanabe et al. | |
| 4,991,678 A | | 2/1991 | Furuya et al. | |
| 5,119,298 A | | 6/1992 | Naito et al. | |
| 5,234,091 A | | 8/1993 | Kobayashi et al. | |
| 5,404,301 A | * | 4/1995 | Slicker | 701/60 |
| 5,687,824 A | | 11/1997 | Hara et al. | |
| 5,701,247 A | | 12/1997 | Sasaki et al. | |
| 6,561,331 B1 | * | 5/2003 | Sola et al. | 192/13 R |
| 6,675,677 B2 | | 1/2004 | Thomas et al. | |

(Continued)

FOREIGN PATENT DOCUMENTS

DE    3814435 A1    11/1988

(Continued)

*Primary Examiner*—David D. Le
(74) *Attorney, Agent, or Firm*—Harness, Dickey & Pierce, P.L.C.

(57) ABSTRACT

The drive train of an all-wheel drive vehicle comprises a transfer case that is connected to the motor block, a driven front axle, a driven rear axle, drive shafts and a control device. To vary the torque distribution between the axles from 0 to 100% the transfer case has a drive-through shaft that has a drive connection both with the motor block and the drive shaft that leads to the rear axle. The drive-through shaft includes a drive connection with the drive shaft that leads to the front axle by a first friction clutch that determines the torque applied to the front axle. The rear axle is equipped with an additional adjustable drive unit comprising a second friction clutch, which is used to control the torque applied to the rear axle.

17 Claims, 2 Drawing Sheets

Figure 1:
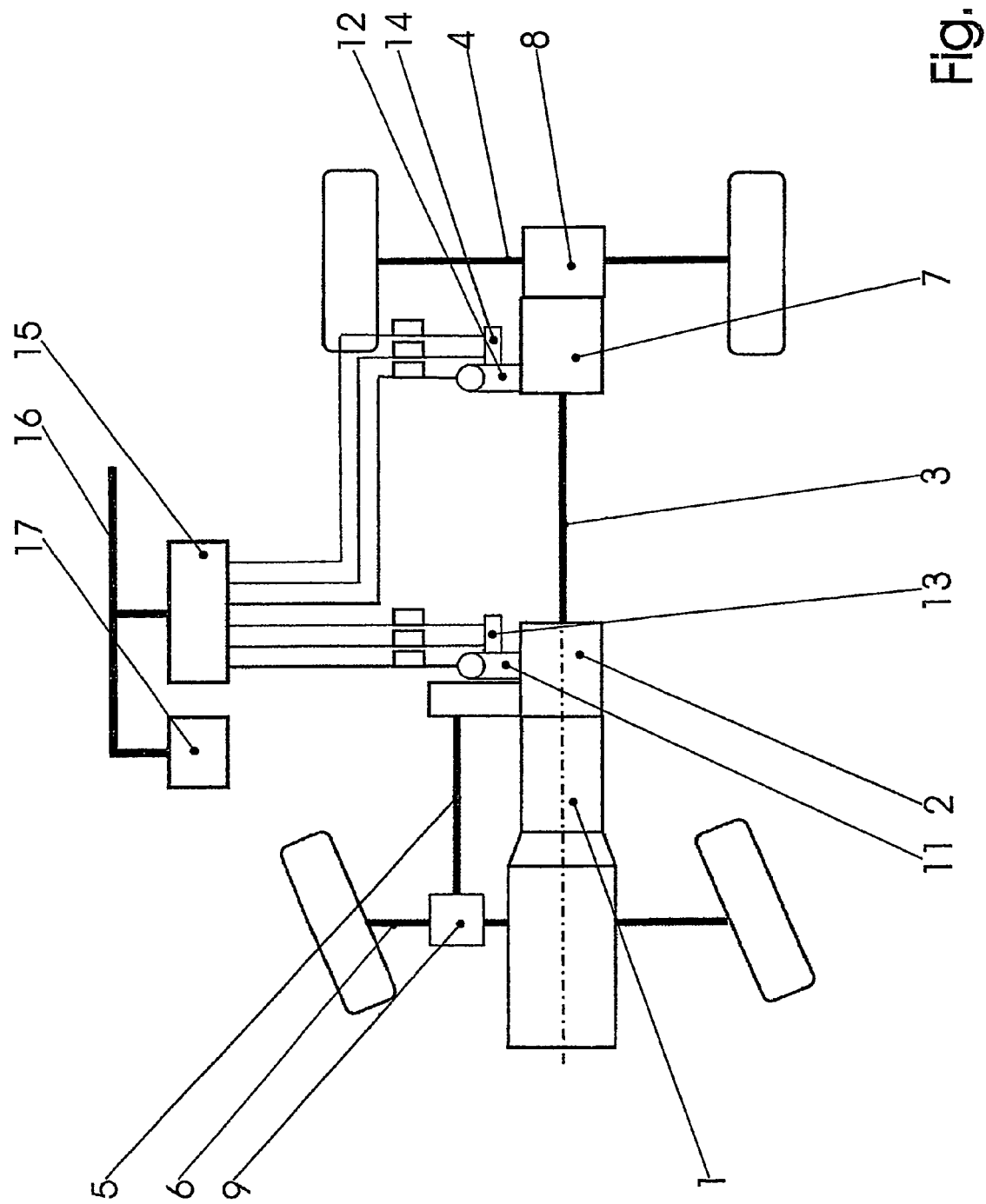

U.S. PATENT DOCUMENTS 6,878,085 B2 * 4/2005 Matsuno ............... 475/254
7,044,880 B2 * 5/2006 Bowen ................. 475/205

FOREIGN PATENT DOCUMENTS

| DE | 3817669 | A1 | 12/1989 |
| DE | 10057884 | A1 | 6/2001 |
| JP | 62292529 | A | 12/1987 |
| WO | 91/12152 | A1 | 8/1991 |
| WO | 2005/035295 | A | 4/2005 |

\* cited by examiner

DRIVE TRAIN OF AN ALL-WHEEL DRIVE VEHICLE

CROSS-REFERENCE TO RELATED APPLICATIONS

This application is a National Stage of International Application No. PCT/AT2005/000057, filed Feb. 22, 2005, and which claims the benefit of Austrian Utility Model No. GM 128/2004, filed Feb. 23, 2004. The disclosures of the above applications are incorporated herein by reference.

FIELD

The invention relates to a drive train of an all-wheel drive vehicle consisting of a transfer case adjoining the engine transmission block, a driven front axle and a driven rear axle, the drive shafts leading from the transfer case to the axles and a control device, with the torque metered to the drive shafts being able to be regulated by variable loading of friction couplings.

BACKGROUND

The statements in this section merely provide background information related to the present disclosure and may not constitute prior art.

In currently common drive trains of all-wheel vehicles, only the torque channeled off for the drive of the front axle is controlled by means of a friction coupling. In all-wheel vehicles of the latest generation, however, the torque metered to both axles should be controllable over the total range from 0 to 100 percent. In this manner, the torque metered to the front axle cannot only be regulated in a range from zero up to a proportion fixed by the design and manner of construction, which lies at around 50%, but from 0 to 100%, that is from purely rear wheel drive to purely front wheel drive. All-wheel drive can thus also satisfy all dynamic driving demands and safety demands for fast road driving beyond off-road operation. This also includes the compatibility with electronic systems which act on the brakes of the vehicle. The term "torque vectoring" has become common for this in the technical world.

A drive train of this type is known, for instance, from U.S. Pat. No. 4,709,775. In this, the transfer case adjoining the engine transmission block contains two friction couplings, one in the path to the drive shaft of the front axle and one in the path to the drive shaft of the rear axle. Transfer cases of this type are bulky, expensive and complex assemblies. Above all the substantial requirement of construction space is very problematic subsequent to the transmission, where it is anyway very tight.

A drive train for all-wheel vehicles having two or even four coupling units which meter a regulatable torque to each axle or to each individual wheel, is known from DE 38 14 435 Each coupling unit consists of a controllable liquid friction coupling and of a friction coupling which can be engaged and disengaged, that is a non-controllable friction coupling, for the bridging of the first. The construction effort and the space requirements as well as the regulation problems of this solution are prohibitive. Due to the diversion via the controllable liquid friction coupling, an accurate and fast control is also not even possible.

A drive train is known from U.S. Pat. No. 5,119,298 comprising a transfer case which drives through rigidly to the rear axle and channels off the torque for the front axle by means of the friction coupling. This drive train belongs to the older generation of drive trains which do not permit any variation in the torque distribution between 0 and 100%, but it does show the construction of a transfer case customary in such drive trains.

SUMMARY

It is therefore the aim of the invention to set forth a drive train which permits the variation of the torque distribution between 0 and 100% with a simpler and more space-saving construction and low costs, and indeed fast and accurately.

In accordance with the invention, this is achieved in that the transfer case has a drive through shaft which is connected drivewise to the engine transmission block, one the one hand, and to the drive shaft leading to the rear axle, on the other hand, said drive through shaft being connected drivewise to the drive through shaft leading to the front axle via a coaxial friction coupling determining the torque metered to the front axle and via an offset drive and in that a further regulatable drive unit having a friction coupling is provided at the rear axle which regulates the torque metered to the rear axle.

A customary transfer case such as is used in drive trains of the older generation without the torque distribution variable between 0 and 100 percent can thus be used as the transfer case.

They are thereby tested drive components which are cheap due to the large volumes and which take up only a little construction space in the longitudinal direction of the vehicle and upwardly. The further regulatable drive unit having a friction coupling at the rear axle can be of any desired construction type and actuation type; it can easily be accommodated in the vicinity of the rear axle differential. In addition, a better axle load distribution is also thereby attained.

The actuators of the two friction couplings are preferably of the same type and are controlled from a common control device. Actuators of the same type respond to control signals of the same type. A single control device which controls both couplings simultaneously is thereby sufficient.

In a preferred embodiment, the further friction coupling is drive connected to the first drive shaft, on the one hand, and to the differential of the rear axle, on the other hand, and is accommodated in a housing in a unit construction block with the housing of the differential. The construction combination in one housing complex provides further economy of space and a reduction in costs by a common utilization of bearings and lubrication devices.

In a further development of the invention and while utilizing the possibilities opened up by it, the couplings can be designed such that the transfer casing and the drive unit have a number of same parts. These can be mechanical parts of the coupling, the actuators and, with correspondingly disposed separation joints, also housing parts. It is also within the framework of the invention to provide a parking lock gear, downstream of the friction coupling in the force-flow direction, in the transfer case or in the drive unit with the further friction coupling. Such a one is considered necessary in drive trains without a compulsory connection to the road as a safety measure. This is also why it is disposed downstream. It can be accommodated particularly practically here or there in a drive train in accordance with the invention.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
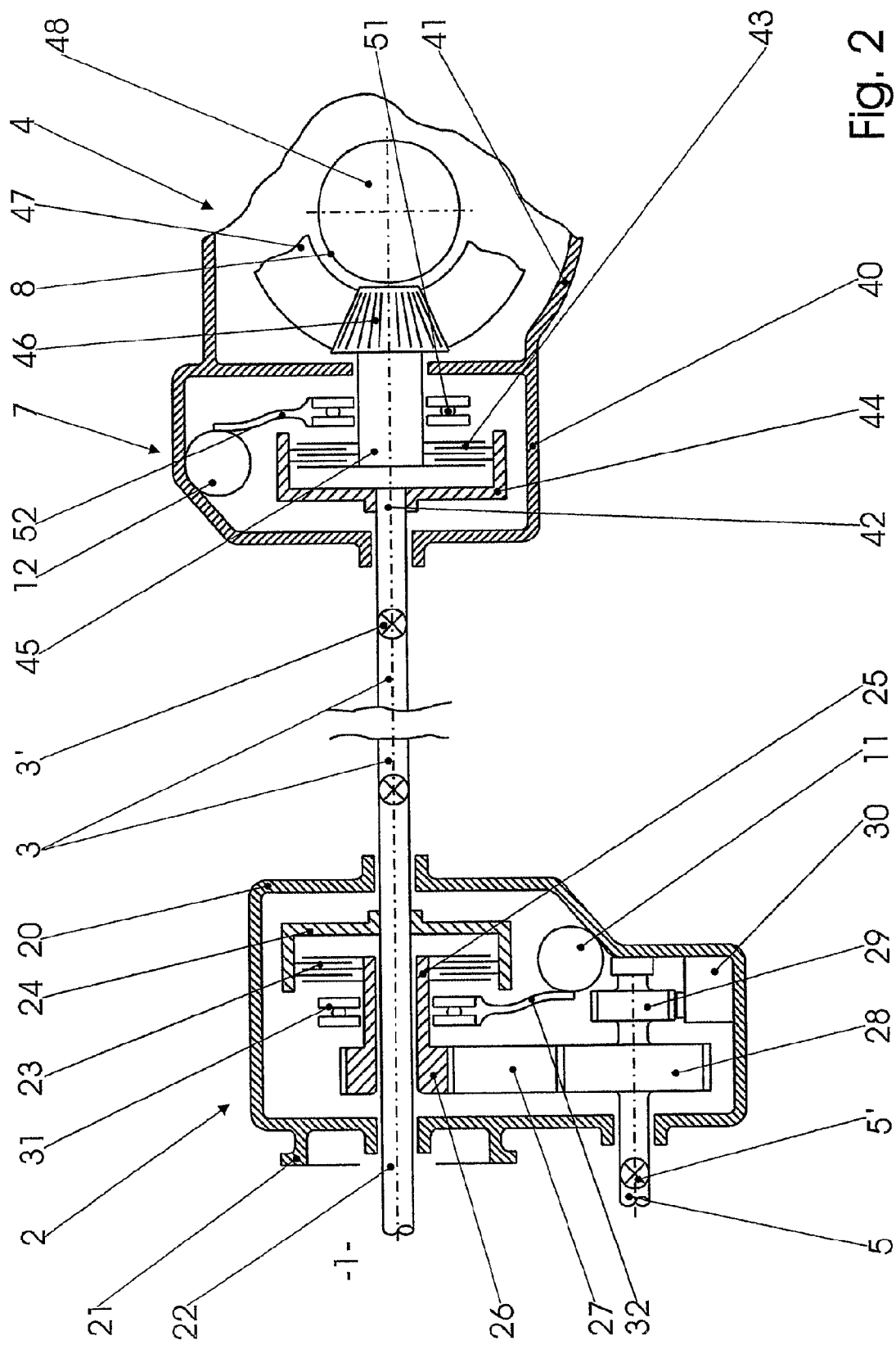

FIG. 1 schematically illustrates a drive train in accordance with the invention;

FIG. 2 details A and B enlarged and in somewhat more detail.

DETAILED DESCRIPTION

The following description is merely exemplary in nature and is not intended to limit the present disclosure, application, or uses. It should be understood that throughout the drawings, corresponding reference numerals indicate like or corresponding parts and features.

In FIG. 1, an all-wheel drive motor vehicle is reduced to its drive train. An engine transmission unit 1 is connected to a transfer case 2. A first drive shaft 3 leads from this to the rear axle 4 and a second drive shaft 5 leads from this to the front axle 6. The first drive shaft 3 leads into a drive unit 7 which is adjoined by a rear axle drive 8 with a rear wheel differential for the drive of the wheels of the rear axle 4. The second drive shaft 5 leads into a front axle drive unit 9 with a front axle differential.

The transfer case 2 and the drive unit 7 include controllable couplings (see FIG. 2) which can each be actuated by means of a first actuator 11 and of a second actuator 12. Position sensors 13, 14 are attached to the actuators 11, 12. They generate position signals for a common control device 15 which controls the actuators 11, 12. The control device 15 is connected via a CAN bus 16 to, inter alia, an ABS control device 17 or another electronic brake or drive stability control.

In FIG. 2, the transfer case 2 and the drive unit 7 are shown somewhat more accurately, with bearings and details not essential to the invention, however, being omitted. The first drive shaft 3 and the second drive shaft 5 are shown broken open here and are connected via universal joints 3' 5' or the like to the transfer case 2 or the drive unit 7. The transfer case 2 is accommodated in a housing 20 connected to the engine transmission block 1 by means of a flange 21. A first coupling 23 is arranged on a drive through shaft 22 and is a friction coupling having multiple inner or outer disks. It furthermore consists of a coupling bell 24, rotationally fixedly connected to the drive through shaft 22, on the primary side, and of an inner coupling part 25, on the secondary side, which is a hollow shaft supported on the drive through shaft 22 here. The hollow shaft is rotatably fixedly connected to or integral with a first sprocket 26 which, via a chain 27 or the like, drives a second sprocket 28 which is rotationally fixedly connected to the second drive shaft 5. The sprockets 26, 28 and the chain 27 form an offset drive which could equally easily be made only by toothed wheels or other transmission means.

The coupling 23 is actuated by the actuator 11, for example, via articulated jacks 32 and ramp rings 31.

The drive unit 7 is accommodated in a housing 40 which is integral with or fixedly connected to a housing 41 of the rear axle drive 8. The first drive shaft 3 merges here, at the universal joint 3' into an input shaft 42 which leads to a second coupling 43 which is again also a friction coupling with multiple inner and outer disks. It furthermore consists of a coupling bell 44 rotationally fixedly connected to the input shaft 42 and of an inner coupling part 45 which simultaneously forms the shaft for a pinion 46 which acts on the rear axle differential 48 via a ring gear 47. This coupling is actuated in a controlled manner by the second actuator 12 via a lever 52 and ramp rings 51.

It can also be recognized in FIG. 2 that the two controllable friction couplings 23, 43 are of the same construction, apart from the difference between the inner coupling part 25 of the first coupling 23 and the inner coupling part 45 of the second coupling 43 forming the pinion shaft. The actuators 11, 12 and the levers 32, 52 as well as the ramp rings 31, 51 are likewise identical components.

Overall, a simple and nevertheless complete solution is provided by the division of the function of a complex and bulky assembly developed specifically for "torque vectoring" into two simple and largely conventional units arranged separately from one another. This solution is much cheaper and has more economy of space due to the largely conventional part units which can be produced in large series.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A drive train of an all-wheel drive vehicle, comprising:
a driven front axle and a driven rear axle;
a front drive shaft leading to the front axle;
a rear drive shaft leading to the rear axle;
a transfer case adapted to be coupled to an engine transmission block and including a drive through shaft having a first end adapted to be drivingly connected to the engine transmission block and a second end fixed for rotation with the rear drive shaft;
a first friction coupling selectively drivingly interconnecting the drive through shaft and the front drive shaft;
a second friction coupling provided at the rear axle to selectively drivingly interconnect and disconnect the drive through shaft and a rotatable input to the rear axle; and
a control device to regulate the magnitude of torque transferred by the first and second friction couplings.

2. The drive train of claim 1, wherein the first and second friction couplings include identical components.

3. The drive train of claim 1, further including a parking lock gear positioned downstream from one of the friction couplings in the force-flow direction.

4. The drive train of claim 1 wherein the control device is in communication with a vehicle braking control device.

5. The drive train of claim 1, wherein each of the first and second friction couplings includes substantially similar actuators being controlled by the common control device.

6. The drive train of claim 5 further including sensors in communication with the control device and operable to output signals indicative of the position of the actuators.

7. The drive train of claim 5 wherein at least one of the actuators includes an articulated jack coupled to a ramp ring.

8. The drive train of claim 5, wherein the second friction coupling is connected drivewise to the rear drive shaft, and to a differential of the rear axle.

9. The drive train of claim 8 wherein the second friction coupling is positioned in a housing fixed to a housing of the differential.

10. The drive train of claim 9 wherein the second friction coupling housing is formed as one-piece with the differential housing.

11. The drive train of claim 1 wherein the transfer case includes a housing containing the first friction coupling and a transfer mechanism driven by an output of the first friction coupling, the transfer case housing including a pair of coaxially aligned apertures through which the drive through shaft extends.

12. The drive train of claim 11 wherein the drive through shaft is a monolithic component.

13. The drive train of claim 12 further including a parking lock in driving engagement with the transfer mechanism.

14. A drive train of a vehicle having first and second sets of driven wheels, the drive train comprising:

a power transmission device including a one-piece through shaft having an input end adapted to be drivingly connected to a power source and an opposite output end, an output shaft adapted to transfer torque to the first set of driven wheels being offset from the through shaft, a transfer mechanism to transmit torque between the through shaft and the output shaft and a first friction coupling selectively drivingly interconnecting the drive through shaft and the transfer mechanism;

a rear axle assembly including a differential assembly and a second friction coupling adapted to transfer torque between the through shaft and the differential assembly, wherein power is not transferred between the power source and the differential assembly when the second friction coupling is not transferring torque; and a control device to regulate the magnitude of torque transferred by the first and second friction couplings.

15. The drive train of claim 14 wherein each of the first and second friction couplings includes substantially similar actuators being controlled by the common control device.

16. The drive train of claim 15 wherein the rear axle assembly includes a one-piece housing containing the differential assembly and the second friction coupling.

17. The drive train of claim 16 wherein the power transmission device includes a parking lock gear associated with the transfer mechanism.

* * * * *